US012621040B2

(12) United States Patent
Zheng et al.

(10) Patent No.: US 12,621,040 B2
(45) Date of Patent: *May 5, 2026

(54) GAIN PATTERN OVERLAP REDUCTION

(71) Applicant: QUALCOMM Incorporated, San Diego, CA (US)

(72) Inventors: Lizhi Zheng, San Diego, CA (US); Guining Shi, San Diego, CA (US); Allen Minh-Triet Tran, Rancho Santa Fe, CA (US); Mahmoud Shirazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 18/348,209

(22) Filed: Jul. 6, 2023

(65) Prior Publication Data

US 2023/0353225 A1 Nov. 2, 2023

Related U.S. Application Data

(63) Continuation of application No. 17/683,096, filed on Feb. 28, 2022, now Pat. No. 11,736,176.

(51) Int. Cl.
H04B 7/08 (2006.01)
H01Q 1/24 (2006.01)
(Continued)

(52) U.S. Cl.
CPC .............. H04B 7/08 (2013.01); H01Q 1/243 (2013.01); H01Q 1/245 (2013.01); H01Q 21/29 (2013.01); H01Q 25/00 (2013.01)

(58) Field of Classification Search
CPC .......... H04B 7/08; H01Q 1/243; H01Q 1/245; H01Q 21/29; H01Q 25/00; H01Q 5/40;
(Continued)

(56) References Cited

U.S. PATENT DOCUMENTS 6,127,987 A    10/2000  Maruyama et al.
6,980,173 B2 * 12/2005  Man ....................... H01Q 1/243
                                                              343/702
(Continued)

FOREIGN PATENT DOCUMENTS

CN         111883905 A     11/2020

OTHER PUBLICATIONS

International Search Report and Written Opinion—PCT/US2023/061625—ISA/EPO—Apr. 25, 2023.

*Primary Examiner* — Davetta W Goins
(74) *Attorney, Agent, or Firm* — Smith Tempel Blaha LLC/Qualcomm Incorporated

(57)        ABSTRACT
A wireless communication device includes: a first antenna configured to provide a first gain pattern at a millimeter-wave radio frequency and having a first boresight direction; a second antenna configured to provide a second gain pattern at the millimeter-wave radio frequency and having a second boresight direction that is different from the first boresight direction; and an electrically-conductive device; where the first antenna, in combination with the electrically-conductive device, is configured to provide a third gain pattern that has a first gain differential relative to the second gain pattern that is greater than a second gain differential between the first gain pattern and the second gain pattern over a range of angles relative to the wireless communication device.

20 Claims, 10 Drawing Sheets

(51) Int. Cl.
  *H01Q 21/29*          (2006.01)
  *H01Q 25/00*          (2006.01)

(58) Field of Classification Search
  CPC .. H01Q 15/0013; H01Q 21/20; H01Q 21/293;
                                    H01Q 1/521
  See application file for complete search history.

(56)                References Cited

U.S. PATENT DOCUMENTS

| | | | |
|---|---|---|---|
| 9,641,229 | B2 | 5/2017 | Islam et al. |
| 10,084,241 | B1 | 9/2018 | Jenwatanavet et al. |
| 11,171,682 | B2 | 11/2021 | Chi et al. |
| 11,736,176 | B1 | 8/2023 | Zheng et al. |
| 12,346,084 | B2 * | 7/2025 | Wang ................... G05B 19/056 |
| 2002/0190909 | A1 * | 12/2002 | Yamamoto ............. H01Q 5/371 |
| | | | 343/742 |
| 2004/0075613 | A1 * | 4/2004 | Jarmuszewski ........ H01Q 1/243 |
| | | | 343/702 |
| 2011/0319041 | A1 * | 12/2011 | Qi ........................ H04B 1/3833 |
| | | | 455/90.2 |
| 2015/0116153 | A1 | 4/2015 | Chen et al. |
| 2016/0240925 | A1 | 8/2016 | Xue et al. |
| 2017/0214120 | A1 | 7/2017 | Lee et al. |
| 2019/0020121 | A1 | 1/2019 | Paulotto et al. |
| 2019/0179378 | A1 | 6/2019 | Xia et al. |
| 2019/0305432 | A1 | 10/2019 | Kim et al. |
| 2020/0212569 | A1 | 7/2020 | Kumar et al. |
| 2020/0412022 | A1 * | 12/2020 | Yun ........................ H01Q 21/08 |
| 2021/0151859 | A1 * | 5/2021 | Park ........................ H01Q 5/48 |
| 2021/0249751 | A1 | 8/2021 | Lee et al. |
| 2021/0305687 | A1 | 9/2021 | Kim et al. |
| 2022/0093026 | A1 * | 3/2022 | Caratelli et al. ......... H01Q 3/36 |
| | | | 343/778 |
| 2023/0299819 | A1 * | 9/2023 | Zhu ........................ H01Q 21/20 |
| | | | 375/267 |
| 2023/0402749 | A1 * | 12/2023 | Caratelli .............. H01Q 21/293 |

* cited by examiner

GAIN PATTERN OVERLAP REDUCTION

CROSS-REFERENCE TO RELATED APPLICATION

This application is a continuation of U.S. patent application Ser. No. 17/683,096, filed on Feb. 28, 2022, entitled "GAIN PATTERN OVERLAP REDUCTION," which is assigned to the assignee hereof, and the entire contents of which are hereby incorporated herein by reference for all purposes.

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support communication over a range of frequencies.

It is often desirable to have multiple communication technologies, e.g., to enable multiple communication protocols concurrently, and/or to provide different communication capabilities. For example, as wireless communication technology evolves from 4G to 5G or to different wireless local area network (WLAN) standards, for example, mobile communication devices may be configured to communicate using different frequencies, including frequencies below 7 GHz often used for 4G and some WLAN communications, and millimeter-wave frequencies, e.g., above 23 GHz, for 5G and some WLAN communications. Communicating using different frequencies, however, may be difficult, especially using mobile wireless communication devices with small form factors.

SUMMARY

An example wireless communication device includes: a first antenna comprising one or more first antenna elements with one or more of the one or more first antenna elements being configured to provide a first gain pattern at a millimeter-wave radio frequency, the first antenna having a first boresight direction; a second antenna comprising one or more second antenna elements with one or more of the one or more second antenna elements being configured to provide a second gain pattern at the millimeter-wave radio frequency, the second antenna having a second boresight direction that is different from the first boresight direction; and an electrically-conductive device, comprising at least one conductive surface; where the first antenna, in combination with the electrically-conductive device, is configured to provide a third gain pattern that has a first gain differential relative to the second gain pattern that is greater than a second gain differential between the first gain pattern and the second gain pattern over a range of angles relative to the wireless communication device.

Implementations of such a wireless communication device may include one or more of the following features. The range of angles relative to the wireless communication device includes the second boresight direction. The first antenna has a first length, and the electrically-conductive device has a second length that is at least as long as the first length. The second length is less than twice the first length. The first antenna defines an aperture plane substantially perpendicular to the first boresight direction, wherein the one or more first antenna elements are disposed on a first side of the aperture plane and at least a portion of the at least one conductive surface is disposed on a second side of the aperture plane opposite the first side of the aperture plane. The first antenna has an edge in the aperture plane, and wherein the at least a portion of the at least one conductive surface extends away from the aperture plane at least 20°, relative to the edge, on the second side of the aperture plane. The first antenna defines an aperture plane substantially perpendicular to the first boresight direction, and wherein the one or more first antenna elements and at least a portion of the at least one conductive surface are disposed on a same side of the aperture plane. The first antenna has an edge in the aperture plane, and wherein the at least a portion of the at least one conductive surface extends away from the aperture plane at least 20°, relative to the edge, on the same side of the aperture plane.

Also or alternatively, implementations of such a wireless communication device may include one or more of the following features. The at least one conductive surface is displaced from the first antenna by between 20% of a wavelength at the millimeter-wave radio frequency and 50% of the wavelength at the millimeter-wave radio frequency. The at least one conductive surface defines a conductive plane within 20° of parallel to the first boresight direction. The electrically-conductive device comprises a frequency-selective surface configured to inhibit passage through the electrically-conductive device of first energy of a particular frequency range more than second energy outside the particular frequency range, the particular frequency range including the millimeter-wave radio frequency. The millimeter-wave radio frequency is a first frequency that is above 25 GHZ, the wireless communication device further comprising a third antenna that includes the electrically-conductive device, and wherein the electrically-conductive device is configured to provide a fourth gain pattern at a second frequency band that is below 7 GHZ. The electrically-conductive device comprises a monolithic conductor that provides the at least one conductive surface.

Also or alternatively, implementations of such a wireless communication device may include one or more of the following features. The electrically-conductive device comprises a frequency-selective surface configured to inhibit passage through the electrically-conductive device of first energy of a particular frequency range more than second energy outside the particular frequency range, the particular frequency range including the millimeter-wave radio frequency. The frequency-selective surface comprises a plurality of conductive cells displaced from each other. The frequency-selective surface is configured to suppress frequencies in an approximately 3 GHZ bandwidth in the 20 GHz or 30 GHz range by 15 dB or more. The wireless communication device includes a processor communicatively coupled to the first antenna and the second antenna and configured to: determine a first power level of a first signal received by the first antenna from a particular angle relative to a housing of the wireless communication device; determine a second power level of a second signal received by the second antenna from the particular angle relative to the housing; and select one of the first antenna and the second antenna to at least one or transmit or receive a third signal corresponding to the particular angle relative to the housing based on which of the first power level and the second power level is higher.

Also or alternatively, implementations of such a wireless communication device may include one or more of the following features. The wireless communication device includes a housing containing the first antenna and the second antenna and defining at least a partially cuboidal shape including a first surface, a second surface, and a third surface, where the first boresight direction is substantially perpendicular to the first surface, the second boresight direction is substantially perpendicular to the second surface, and the second surface is disposed opposite the third surface and displaced from the third surface along an axis of the housing, and where the first antenna is displaced a first distance along the axis from the second surface and displaced a second distance along the axis from the third surface, the first distance being shorter than the second distance.

DETAILED DESCRIPTION

Figure 1:
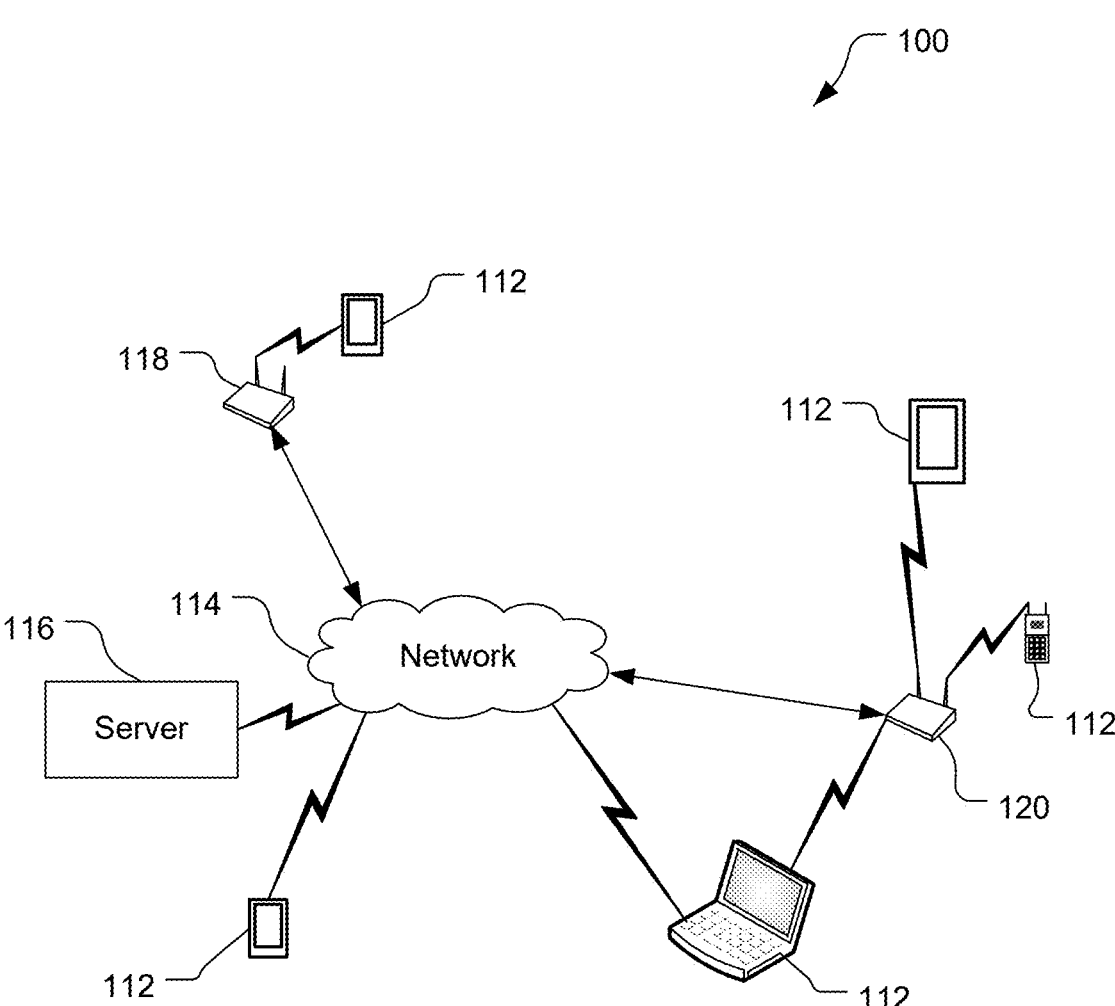
FIG. 1 is a schematic diagram of a communication system.

Techniques are discussed herein for reducing gain pattern overlap between antennas. For example, gain differentials for different millimeter-wave antennas of a wireless communication device for the same angles relative to the wireless communication device may be increased. For example, the gain value for a first antenna may be decreased at and near a boresight direction of a second antenna, e.g., without significantly affecting a gain pattern of the second antenna. The first and second antennas may be disposed on adjacent faces of the wireless communication device, e.g., with the boresights of the first and second antennas being approximately orthogonal. An electrically-conductive device may be placed near the first antenna to decrease gain values of the first antenna near the boresight of the second antenna. For example, the electrically-conductive device may be a device that is dedicated to inhibiting transmission and/or reception by the first antenna of radio frequency signals at angles near the boresight (and/or another group of angles) of the second antenna. As another example, the electrically-conductive device may be a frequency-selective surface configured to provide a band-stop filter, rejecting frequencies in a particular band significantly while allowing signals outside the particular band to pass with (e.g., little or no) attenuation. As another example, the electrically-conductive device may serve two or more purposes, e.g., affecting the gain pattern of the first antenna and serving as at least a portion of a third antenna, e.g., for transmission/reception of signals at significantly different frequencies (e.g., sub-6 GHz) than for the millimeter-wave antennas. A processor of the wireless communication device may select between the first and second antennas for signal reception and/or transmission, e.g., based on power of signals received by the first and second antennas. Other configurations, however, may be used.

Items and/or techniques described herein may provide one or more of the following capabilities, as well as other capabilities not mentioned. Selection of a better (possibly best) antenna (and/or array) of a wireless communication device for use in signal reception and/or transmission for a particular angle relative to the wireless communication device may be improved, e.g., sped up and accuracy of antenna (and/or array) selection improved, by widening gain differentials between antennas to facilitate selection of an antenna (and/or array) for signal reception and/or transmission. Consequently, latency for communication by and/or determination of position information for the mobile wireless communication device may be reduced. Also or alternatively, latency and/or accuracy and/or throughput of communication using a wireless communication device may be improved. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Referring to FIG. 1, a communication system 100 includes mobile devices 112, a network 114, a server 116, and access points (APs) 118, 120. The communication system 100 is a wireless communication system in that components of the communication system 100 can communicate with one another (at least some times) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The mobile devices 112 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the mobile devices 112, network 114, server 116, and/or APs 118, 120. For example, such other devices may include internet of thing (IoT) devices, medical devices, home entertainment and/or automation devices, automotive devices, etc. The mobile devices 112 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.).

Figure 2:
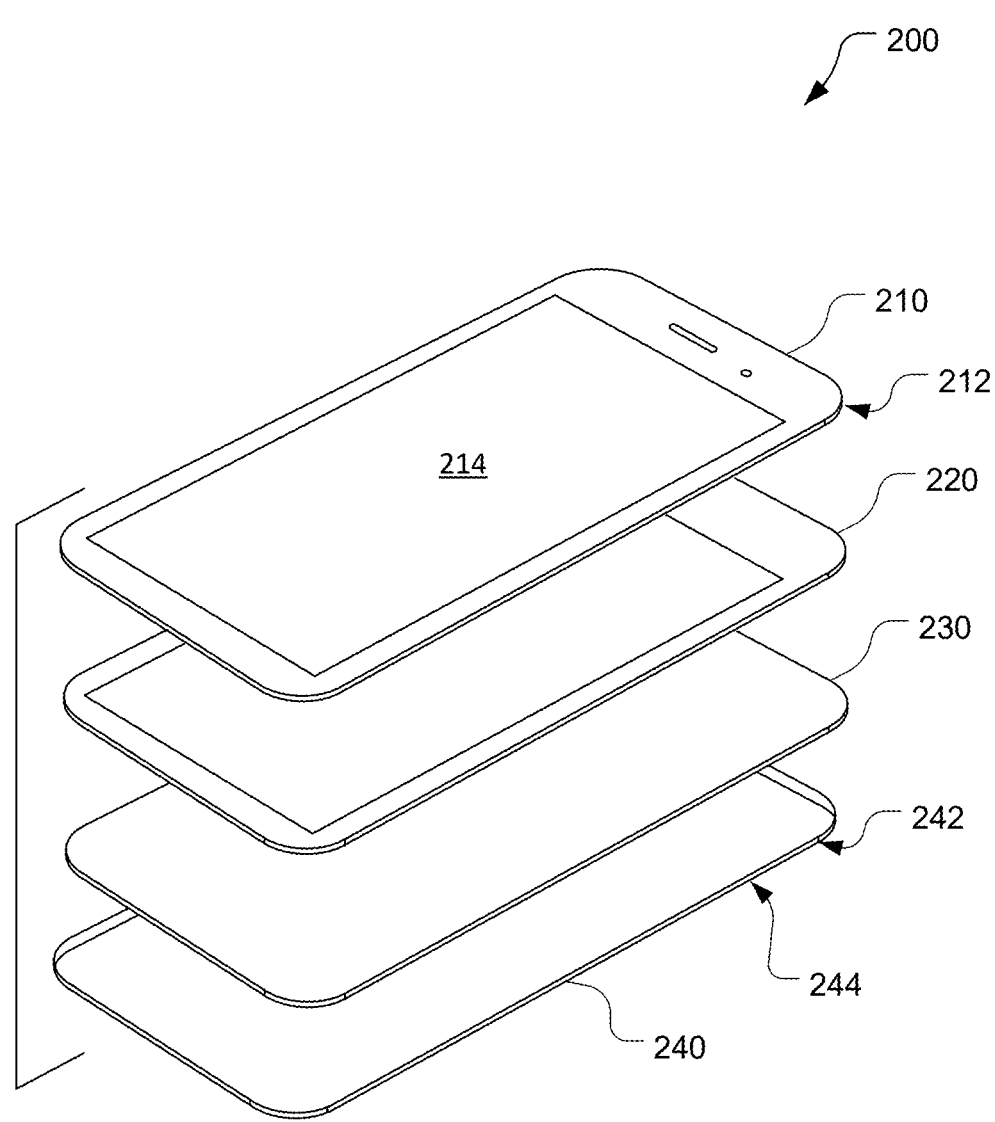
FIG. 2 is an exploded perspective view of simplified components of a mobile device shown in FIG. 1.

Referring to FIG. 2, a mobile device 200, which is an example of one of the mobile devices 112 shown in FIG. 1, includes a top cover 210, a display layer 220, a printed circuit board (PCB) layer 230, and a bottom cover 240. The mobile device 200 as shown may be a smartphone or a tablet computer but embodiments described herein are not limited to such devices (for example, in other implementations of concepts described herein, a device may be a router or customer premises equipment (CPE)). The top cover 210 includes a screen 214. The bottom cover 240 has a bottom surface 244. Sides 212, 242 of the top cover 210 and the bottom cover 240 provide an edge surface. The top cover 210 and the bottom cover 240 comprise a housing that retains the display layer 220, the PCB layer 230, and other components of the mobile device 200 that may or may not be on the PCB layer 230. For example, the housing may retain (e.g., hold, contain) or be integrated with antenna systems, front-end circuits, an intermediate-frequency circuit, and a processor discussed below. The housing may be substantially rectangular, having two sets of parallel edges in the illustrated embodiment, and may be configured to bend or fold. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 230 may not be commensurate with the size and/or shape of either of the top or bottom covers or otherwise with a perimeter of the device. For example, the PCB layer 230 may have a cutout to accept a battery. Further, the PCB layer 230 may include sandwiched boards and/or a PCB daughter board. Daughter boards may be chosen to facilitate a design and/or manufacturing process, e.g., to reinforce a functional separation or to better utilize a space in the housing. Embodiments of the PCB layer 230 other than those illustrated may be implemented.

Figure 3:
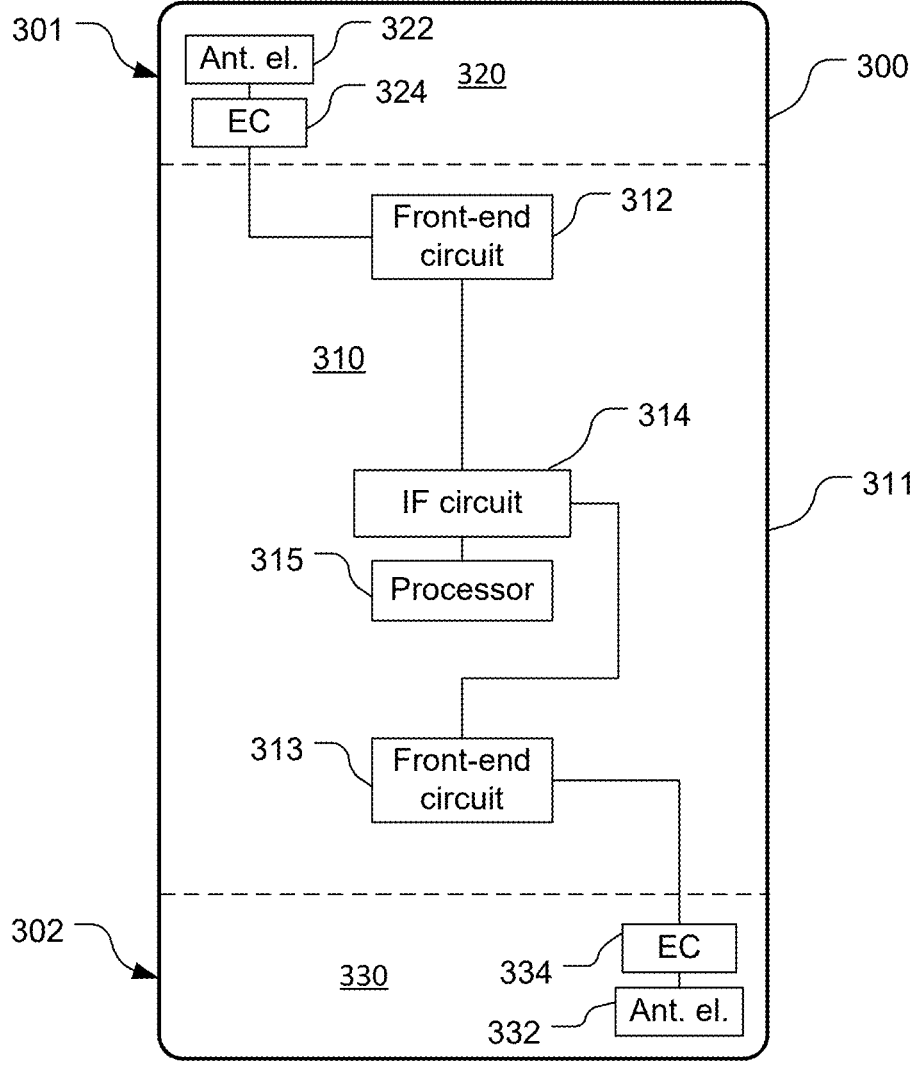
FIG. 3 is a top view of a printed circuit board layer, shown in FIG. 2, including antenna systems.

Referring also to FIG. 3, a PCB layer 300, which is an example of the PCB layer 230, includes a main portion 310 and a portion comprising antenna systems 320, 330. In the example shown, the antenna systems 320, 330 are disposed at opposite ends 301, 302 of the PCB layer 300, but one or both of the antenna systems 320, 330 may be disposed elsewhere, e.g., along a side edge of the PCB layer 300. The antenna system 320 includes one or more antenna elements 322 and one or more energy couplers 324 coupled to the antenna element(s) 322 and configured to convey energy to and/or from the antenna element(s) 322 from and/or to the main portion 310. The antenna system 330 includes one or more antenna elements 332 and one or more energy couplers 334 coupled to the antenna element(s) 332 and configured to convey energy to and/or from the antenna element(s) 332 from and/or to the main portion 310. The antenna element(s) 322 may comprise an array of antenna elements and/or the antenna element(s) 332 may comprise an array of antenna elements and the array(s) of antenna elements may be configured for beamforming. The main portion 310 comprises a PCB 311 that includes front-end circuits 312, 313 (also called radio frequency (RF) circuits), an intermediate-frequency (IF) circuit 314, and a processor 315. The front-end circuits 312, 313 may be configured to provide signals to be radiated by the antenna systems 320, 330 and to receive and process signals that are received by, and provided to the front-end circuits 312, 313 from, the antenna systems 320, 330. The front-end circuits 312, 313 may be configured to convert received IF signals from the IF circuit 314 to RF signals (amplifying with a power amplifier and/or phase shifting signals, for example when coupled to an antenna array, as appropriate), and provide the RF signals to the antenna systems 320, 330 for radiation. The front-end circuits 312, 313 are configured to convert RF signals received by the antenna systems 320, 330 to IF signals (e.g., using a low-noise amplifier and a mixer) and to send the IF signals to the IF circuit 314. The IF circuit 314 is configured to convert IF signals received from the front-end circuits 312, 313 to baseband signals and to provide the baseband signals to the processor 315. The IF circuit 314 is also configured to convert baseband signals provided by the processor 315 to IF signals, and to provide the IF signals to the front-end circuits 312, 313. The processor 315 is communicatively coupled to the IF circuit 314, which is communicatively coupled to the front-end circuits 312, 313, which are communicatively coupled to the antenna systems 320, 330. In some examples, transmission signals may be provided from the IF circuit 314 to the antenna systems 320, 330 by bypassing the front-end circuits 312, 313, for example when further upconversion is not required by the front-end circuits 312, 313. Signals may be received from the antenna systems 320, 330 by bypassing the front-end circuit 312, 313. In other examples, a transceiver separate from the IF circuit 314 may be configured to provide transmission signals to and/or receive signals from the antenna systems 320, 330 without such signals passing through the front-end circuit 312, 313. In some examples, the front-end circuits 312, 313 are configured to amplify, filter, and/or route signals from the IF circuit 314 without upconversion to the antenna system 320, 330. Similarly, the front-end circuits 312, 313 may be configured to amplify, filter, and/or route signals from the antenna systems 320, 330 without downconversion to the IF circuit 314. In other examples, the front-end circuit 312 and/or the front-end circuit 313 is (are) configured to convert between baseband and RF frequencies, or between a low IF frequency and RF, and the IF circuit 314 is bypassed or omitted.

In FIG. 3, dashed lines separating the antenna systems 320, 330 from the PCB 311 indicates functional separation of the antenna systems 320, 330 (and the components thereof) from other portions of the PCB layer 300. Portions of the antenna systems 320, 330 may be integral with the PCB 311, being formed as integral components of the PCB 311. One or more components of the antenna systems 320, 330 may be formed integrally with the PCB 311, and one or more other components may be formed separate from the PCB 311 and mounted to the PCB 311, or otherwise made part of the PCB layer 300 (e.g., on a PCB daughter board). Alternatively, the antenna systems 320, 330 may be formed separately from the PCB 311 and coupled to the front-end circuits 312, 313. In some examples, one or more components of either of the antenna systems 320, 330 may be integrated with the front-end circuits 312, 313, e.g., in a single module or on a single circuit board separate from the PCB 311. For example, the front-end circuits 312, 313 may be physically attached to the antenna systems 320, 330, e.g., attached to back sides of respective ground planes of the antenna systems 320, 330. Antennas of the antenna systems 320, 330 may have front-end circuitry electrically (conductively) coupled and physically attached to the antennas while another antenna may have the front-end circuitry physically separate, but electrically coupled to the other antenna.

Figure 4:
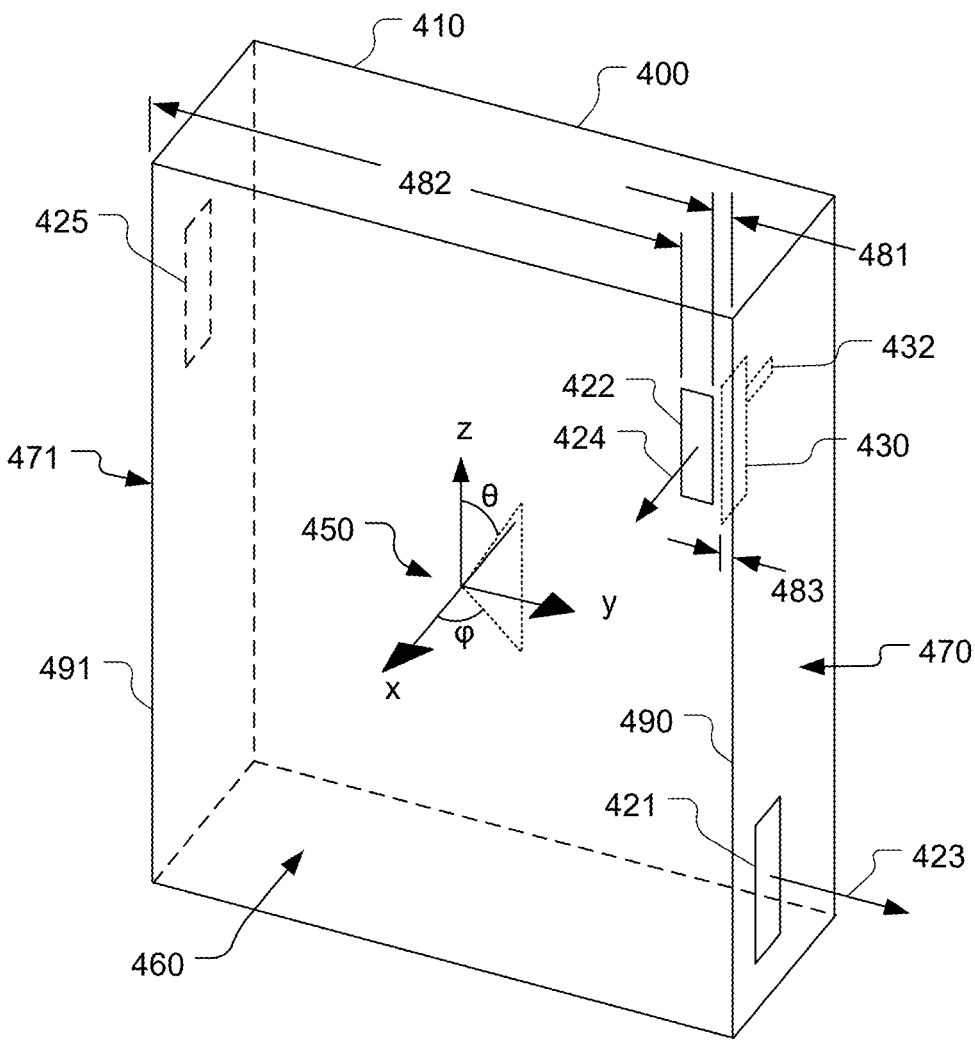
FIG. 4 is a perspective view of a wireless communication device.

Referring also to FIG. 4, a wireless communication device 400 includes a housing 410, antennas 421, 422, and an electrically-conductive device 430. The wireless communication device 400 may be configured for millimeter-wave signal transfer for wireless communication. The wireless communication device 400 may, for example, be a smartphone, a tablet computer, a portion of a portable computer (e.g., a display portion or a base portion of a folding laptop computer), a router, a CPE, etc. The device 400 is an example, and other configurations may be used. For example, more antennas, e.g., an antenna 425, may be included. Each of the antennas 421, 422, and 425 may be representative of one or more antennas (for example, an antenna array) and may be configured for beamforming. The electrically-conductive device 430 includes electrically-conductive material, e.g., metal, configured in such a way to inhibit at least some frequencies of energy from passing through the electrically-conductive device 430, e.g., reflecting at least some frequencies of energy and/or attenuating at least some frequencies of energy. The electrically-conductive device 430 may be disposed near the antenna 422 and/or near one or more other antennas if included in a wireless communication device. As another example, a processor or controller may be included that is configured to activate one or more antennas selectively, e.g., to activate one of the antennas 421, 422 at a time for signal reception and/or transmission. Each of the antennas 421, 422 may be a portion of a respective antenna module that includes a feed structure (e.g., one or more energy couplers) and/or additional antennas (e.g., disposed in an array). Each of the antennas 421, 422 includes one or more antenna elements configured to transduce wireless signals into another form of signal (e.g., from free-space wireless to guided wireless, or from wireless to wired, etc.). The antennas 421, 422 may each be any of a variety of antennas, with one or more antenna elements of any of a variety of types of antenna elements, e.g., patches, horns, open-ended waveguides, substrate-integrated waveguides, wireline elements, monopoles, dipoles, loops, helixes, lenses, microstrips with resonant stubs, slotlines with resonant stubs, etc. The wireless communication device 400 may be referred to by other terms, e.g., an access terminal (AT), a client device, a wireless device, a subscriber device, a subscriber terminal, a subscriber station, a user terminal (UT), a user equipment (UE), a mobile terminal, a mobile station (MS), a mobile device, etc.

Figure 5:
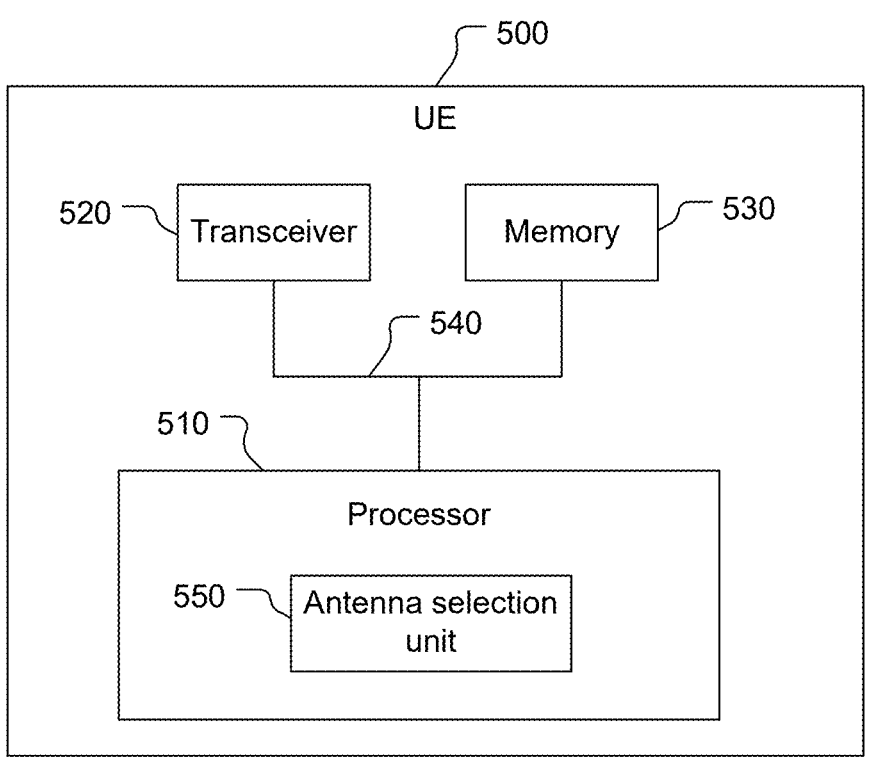
FIG. 5 is a block diagram of an example wireless communication device.

Referring also to FIG. 5, a wireless communication device 500, of which the device 400 may be an example, includes a processor 510, a transceiver 520, and a memory 530 communicatively coupled to each other by a bus 540. The device 500 may include the components shown in FIG. 5. The device 500 may include one or more other components such as one or more components in addition to the components shown and/or one or more additional components included in the components shown. For example, the transceiver 520 may include a wireless transmitter, a wireless receiver, multiple antennas, etc. The memory 530 may be a non-transitory, processor-readable storage medium that includes software with processor-readable instructions that are configured to cause the processor 510 to perform functions.

The description herein may refer to the processor 510 performing a function, but this includes other implementations such as where the processor 510 executes software (stored in the memory 530) and/or firmware. The description herein may refer to the device 500 performing a function as shorthand for one or more appropriate components (e.g., the processor 510 and the memory 530) of the device 500 performing the function. The processor 510 (possibly in conjunction with the memory 530 and, as appropriate, the transceiver 520) may include an antenna selection unit 550. The antenna selection unit 550 is discussed further below, and the description may refer to the processor 510 generally, or the device 500 generally, as performing any of the functions of the antenna selection unit 550, with the device 500 being configured to perform the functions of the antenna selection unit 550.

Figure 6:
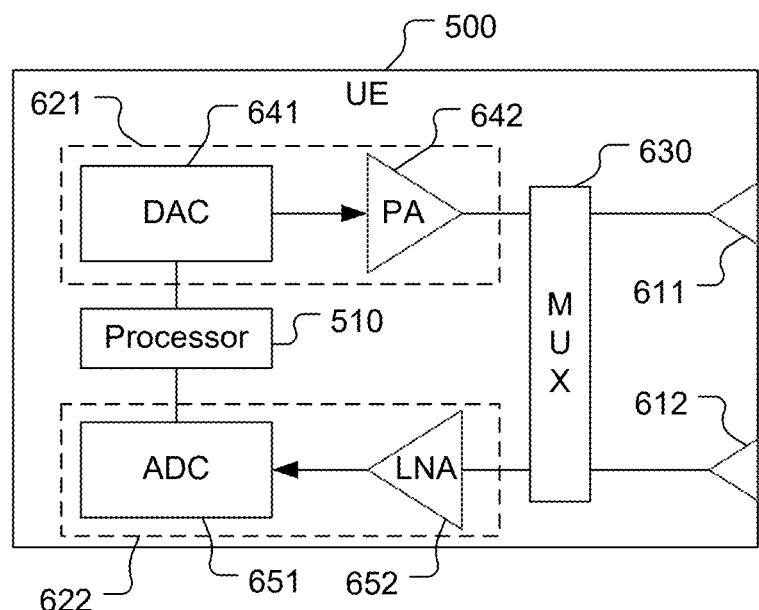
FIG. 6 is a block diagram of transmit and receive chains of the device shown in FIG. 5.

Referring also to FIG. 6, the device 500 (e.g., the transceiver 520) includes multiple antennas 611, 612, e.g., the antennas 421, 422. The transceiver 520 may include one or more receive chains and/or one or more transmit chains, here a transmit chain 621 and a receive chain 622, selectively communicatively coupling the processor 510 to the antennas 611, 612 via a multiplexer (MUX) 630. The transmit chain 621 may include components such as a digital-to-analog converter (DAC) 641 and a power amplifier (PA) 642. The receive chain 622 may include components such as an analog-to-digital converter (ADC) 651 and a low-noise amplifier (LNA) 652. The transmit chain 621 and/or the receive chain 622 may include means (e.g., in the signal path or in an LO (local oscillator) or mixing path) to shift a phase of one or more communication signals. Different receive chains and/or transmit chains may be provided for connection to antennas for receiving/transmitting different frequencies, e.g., mmWave frequencies and sub-6 GHz frequencies. The receive chain may 622 be selectively coupled to one of the antennas 611, 612 at a time (e.g., for receiving signals for different angles relative to the device 500). Similarly, the transmit chain 621 may be selectively coupled to one of the antennas 611, 612 at a time (e.g., for transmitting signals for different angles relative to the device 500). In other examples, the antennas 611 and 612 may be utilized concurrently, and separate transmit and/or receive chains (or portions thereof) may be coupled to each of the antennas 611, 612.

As demand for wireless data bandwidth has increased, millimeter-wave (mmWave) devices have been deployed for 5G wireless technology. Antenna arrays with beamforming capability have been implemented to compensate for high propagation loss at mmWave frequencies. Also, multiple mmWave antennas, such as the antennas 421, 422 of the wireless communication device 400, may offer better spherical coverage (e.g., better antenna gain surrounding a wireless communication device than with a signal antenna) to help ensure sufficiently-strong/accurate signal transfer to/from the wireless communication device for wireless communication. The spherical coverage is relative to a coordinate system 450 with an origin at a center of the wireless communication device 400. The coordinate system 450 includes cartesian (x, y, and z) coordinates and spherical coordinates ($\varphi$ and $\theta$), with angles relative to the wireless communication device 400 referred to by the spherical coordinates. With multiple millimeter-wave modules placed in a wireless communication device such as a user equipment (UE), a housing and/or other components of the UE may cause spreading of a gain pattern (also called an antenna pattern) of each module. This may result in significant overlapping of antenna patterns of separate modules, which may waste spherical gain coverage, e.g., if a single antenna (instead of multiple antennas) is used at any given time, causing degradation of an overall gain cumulative distribution function (CDF). This degradation may degrade throughput and/or latency performance, e.g., due to extra time used to select an antenna from multiple candidates and/or selection of an antenna that provides lower performance than another antenna (e.g., for signal transmission/reception for a particular angle relative to the UE). Overlapping gain patterns may cause confusion for a beam management system that selects an antenna to use, possibly causing the beam management system to select the "wrong" antenna (e.g., an antenna with a lower gain than another antenna for the same angle), e.g., due to a resolution limitation of the beam management system. Consequently, increasing a gain differential between gain patterns for different antennas to avoid confusion for the beam management system can improve latency and/or help avoid selection of the wrong antenna, improving accuracy of signal transfer, data throughput, etc.

Figure 7:
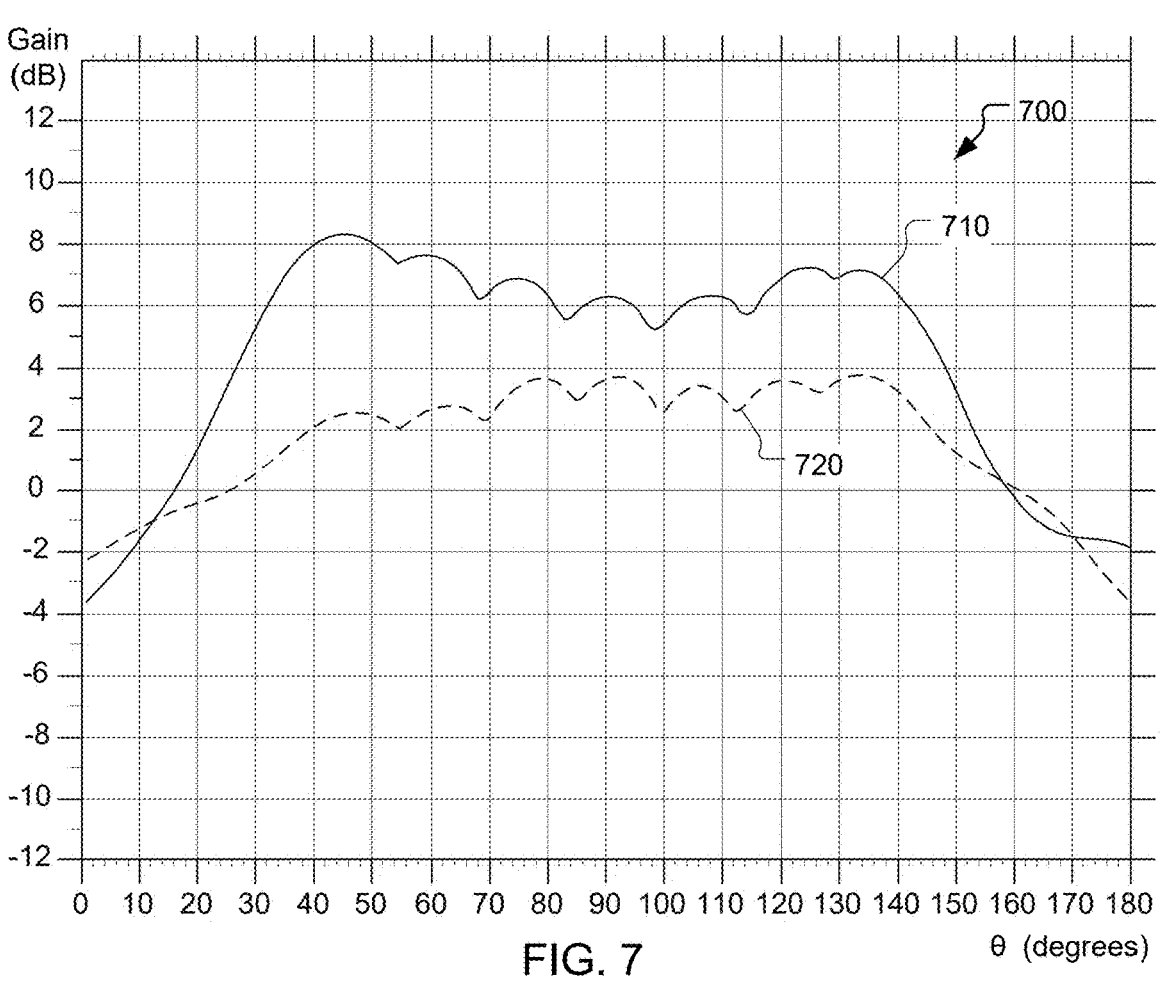
FIG. 7 is a graph of gain patterns of antennas shown in FIG. 4 without an electrically-conductive device shown in FIG. 4.

For example, referring also to FIG. 7, a graph 700 shows simulated plots 710, 720 of slices of gain patterns for the antennas 421, 422 without the electrically-conductive device 430 in place. The plots 710, 720 correspond to the gain provided by the antennas 421, 422 in the y-z plane (with $\varphi=90°$ and $\theta$ ranging from 0° to 180°). In this example, a differential between the plots 710, 720 is approximately 2 dB from about $\theta=78°$ to about $\theta=115°$. This differential may lead to confusion between whether to use the antenna 421 or to use the antenna 422 in this range of $\theta$ for $\varphi=90°$. For example, referring also to FIG. 8, a graph 800 is provided of the space (in spherical coordinates) around the wireless communication device 400. The graph 800 provides indications of which of the antennas 421, 422 (with a "1" corresponding to the antenna 421 and a "2" corresponding to the antenna 422) will be selected for signal transmission and/or reception, with the selection being based on antenna gains at the respective angles. For the sake of simplicity of the figure, indications of the antennas 421, 422 are shown only within a region 810. The antenna 421 may provide a higher gain for all angles in the region 810 near a boresight of the antenna 421. The antenna selection unit 550 may use powers of signals received by the antennas 421, 422 to select which of the antennas 421, 422 to use for signal transmission and/or reception. Using powers of signals received by the antennas 421, 422 to select which of the antennas 421, 422 to use for signal transmission and/or reception, however, may result in selection of the antenna 422 for at least some of the angles in a sub-region 820 of the region 810 even though the antenna 421 provides (slightly) better gain for the angles in the sub-region 820.

Figure 8:
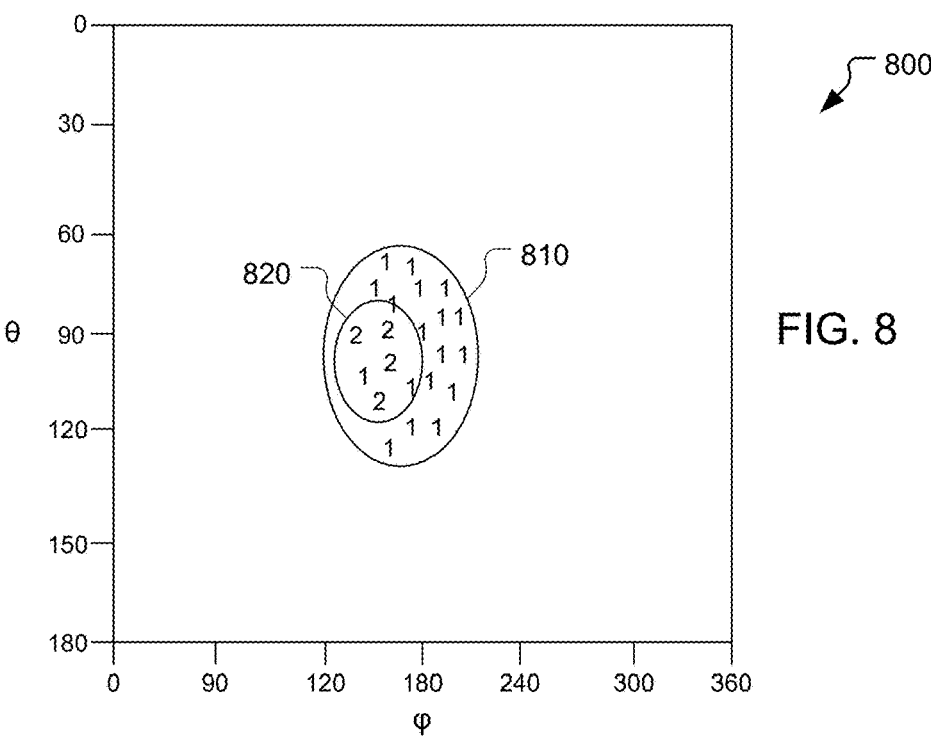
FIG. 8 is a graph indicating antenna selection for different angles relative to the wireless communication device shown in FIG. 4.

The electrically-conductive device 430 is configured and disposed to provide a gain pattern inhibitor for the antenna 422 to inhibit gain in one or more gain overlap regions, e.g., the sub-region 820 shown in FIG. 8, to increase a gain differential between gain patterns of the antennas 421, 422. Numerous implementations of gain pattern inhibitors may be used, including numerous configurations, locations, and/or orientations of the gain pattern inhibitors.

In an example implementation, a gain inhibitor comprises an electrical conductor disposed between an antenna and a second surface of a housing where the antenna is disposed along a first surface that is adjacent to the second surface, and where another antenna is disposed along the second surface, e.g., such that the antennas have boresights directed from the adjacent surfaces. For example, the wireless communication device 400 has at least a partially cuboidal shape, with multiple surfaces connected by edges. The device 400 is at least partially cuboidal, being at least somewhat cube-shaped, having six faces with edges connecting the faces. The device 400 may be fully cuboidal, with the edges being sharp (e.g., 90°) edges as shown, or partially cuboidal, with at least one non-sharp (e.g., rounded) edge connecting adjacent surfaces and/or at least one non-sharp (e.g., rounded) corner. Further, faces may be flat or non-flat (e.g., mostly flat with some deviations from flat, e.g., a button protruding from a surface, a recess (e.g., a port) defined by a surface, etc., although these features are not shown in FIG. 4 for the sake of simplicity of the figure). In this example, the antenna 422 is disposed along a rear surface 460 (e.g., opposite where a display may be) with a boresight 424 directed out of the rear surface 460 (here $\varphi=0°$ and $\theta=90°$, and the antenna 421 is disposed near a side surface 470, adjacent the rear surface 460, with a boresight direction 423 being out of the side surface 470 (here $\varphi=90°$ and $\theta=90°$. Depending on dimensions of the device 400 (e.g., a thickness and curvatures between surfaces), one or more surfaces (e.g., the rear surface 460) may be relatively flat (although a surface may have non-flat features, e.g., one or more buttons, one or more holes, etc.) or may have little or no flat region (e.g., if a side surface was effectively a merging of two rounded edges, one between a rear surface and the side surface and the other between a front surface and the side surface). The electrically-conductive device 430 is disposed along a width (from the surface 470 to an opposite surface 471) between the antenna 422 and the surface 470, e.g., between the antenna 422 and an edge 490 that is between (here, connecting) the surface 460 and the surface 470.

Figure 9:
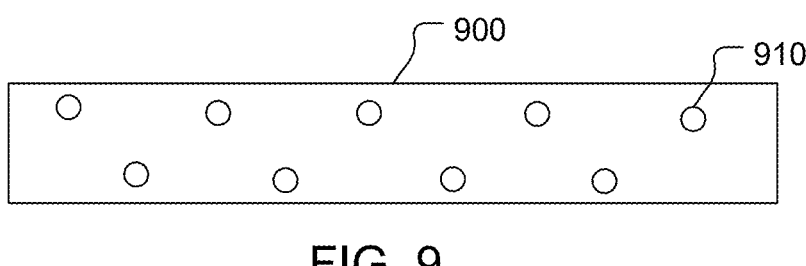
FIG. 9 is an example of the electrically-conductive device shown in FIG. 4.
Figure 10:
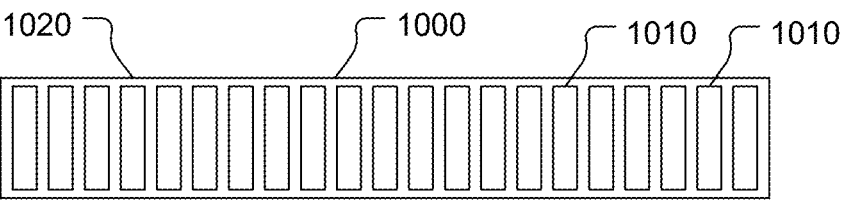
FIG. 10 is another example of the electrically-conductive device shown in FIG. 4.

The electrically-conductive device 430 is configured (e.g., sized and shaped) and disposed to inhibit gain of the antenna 422, e.g., in a region where gain overlap between gain patterns of the antennas 421, 422 is undesirably high (e.g., gain differential between gain patterns is undesirably low, which may lead to selection of the antenna 422 when selection of the antenna 421 would be better, or may cause delayed selection of the antenna 421). For example, the electrically-conductive device 430 may be monolithic, with a solid rectangular shape (i.e., with electrically-conductive material (e.g., metal) occupying an entire area within a perimeter of the electrically-conductive device 430). As another example, referring also to FIG. 9, an example 900 of the electrically-conductive device 430 may be monolithic, with one or more regions 910 within a perimeter of the electrically-conductive device 430 not occupied by electrically-conductive material. A monolithic electrically-conductive device may be a broadband signal blocker that is able to reduce undesired gain of signals for a large frequency range, e.g., 28 GHz to 38.5 GHZ, or a wider band, or a different band (e.g., based on size, shape, and/or location relative to the antenna 422). As another example, referring also to FIG. 10, an example 1000 of the electrically-conductive device 430 may be non-monolithic, with multiple electrically-conductive portions 1010 disposed on a substrate 1020. In this example, the portions 1010 provide a regular pattern of similarly-shaped (here, rectangularly-shaped), electrically-conductive pieces, but other non-monolithic configurations may be used, e.g., as discussed below.

Implementations of the electrically-conductive device 430 may provide a frequency-selective surface (FSS). For example, referring also to FIGS. 11-12, an FSS 1100 comprises a non-monolithic structure, having multiple individual FSS unit cells 1200 arranged in an array. The FSS unit cell 1200 is configured to provide band-stop characteristics, e.g., substantially blocking (e.g., suppressing by 15 dB or more) frequencies between 26 GHZ and 29 GHz, at least in combination in the FSS 1100. In this example, the FSS unit cell 1200 is square, having sides with lengths 1210 measuring about 2 mm, including a gap 1110 between adjacent unit cells. Also in this example, the FSS unit cell 1200 is repetitive, having four repeated patterns of conductor, with each quadrant of the square being identical. While numerous different designs may be used, the unit cell 1200 comprises four strips of metal each extending from a center of the unit cell 1200. Each strip is essentially a T-shaped strip of metal with a base portion (the "vertical" portion of the T) and a top portion (the "horizontal" portion of the T), with a U-shaped deviation in the base portion perpendicular to the base portion (in this case, extending to the left of the base portion (with the base portion being vertical)). In the FSS 1100, the unit cells 1200 are discrete and not connected to each other (e.g., separated by small gaps), such that the discrete unit cells do not form a continuous current path. Further, the FSS 1100 will not significantly impact signals with frequencies outside of a band-stop range, e.g., allowing sub-6 GHz signals to pass with little (e.g., less than 5 dB) or no attenuation. Thus, antennas of the device 400 using frequencies outside of a band stop range may be used with little impact due to use of the FSS 1100, while the FSS 1100 may significantly improve gain differential in regions of gain overlap of antennas that can operate in the band stop range. Other configurations of FSSes may be used, e.g., other sizes of unit cells, non-square shapes of unit cells, another pattern of conductive material in each unit cell, etc. which may substantially block frequencies similar to those noted above or different frequencies (e.g., frequencies between 37 GHZ and 40 GHZ). In some embodiments, a combination of unit cells may be implemented such that the FSS substantially blocks several ranges of frequencies (e.g., frequencies from 26-29 GHz and from 37-40 GHZ). For example, an array of one type or size of unit cell may be adjacent an array of another type or size of unit cell. As another example, unit cells of different sizes and/or configurations may be interleaved.

As another example, implementations of the electrically-conductive device 430 may provide one or more functions in addition to inhibiting gain of an antenna. For example, the electrically-conductive device 430 may be a portion of another antenna. For example, the antenna 422 may be a mmWave antenna and the electrically-conductive device 430 may be an antenna element (e.g., radiating element) of a sub-7 GHz antenna. The electrically-conductive device 430 may be, for example, a dipole, a monopole, a patch, or other form of antenna element, and connected to a signal receive chain and/or a signal transmission chain by one or more energy couplers (e.g., an energy coupler 432 shown in FIG. 4).

Figure 11:
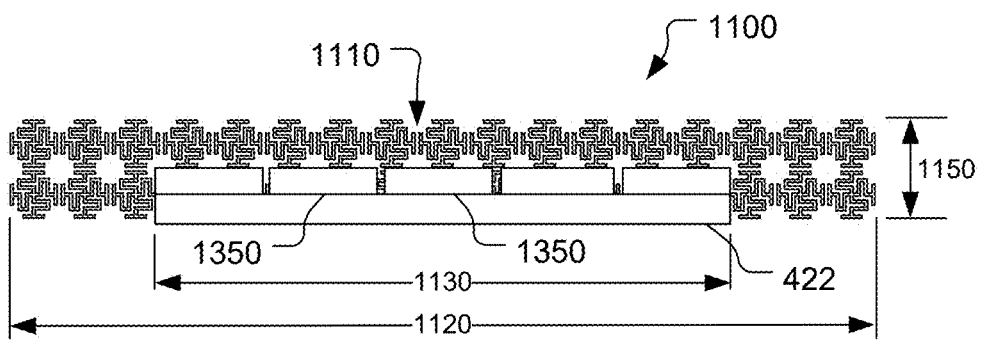
FIG. 11 is a plan view of an antenna and an example of a frequency-selective surface used as the electrically-conductive device shown in FIG. 4.
Figure 12:
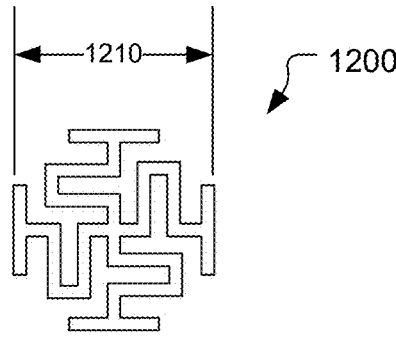
FIG. 12 is a plan view of a unit cell of the frequency-selective surface shown in FIG. 11.

Implementations of the electrically-conductive device 430 may have a variety of dimensions relative to an antenna. For example, as shown in FIG. 11, the FSS 1100 may be longer than a corresponding antenna. In this example, the FSS 1100 has a length 1120 that is longer than a length 1130 of the antenna 422 (which may be an array of antenna elements), e.g., greater than 20% longer than the length 1130, here approximately twice as long as the length 1130. In other example implementations, the length 1120 of the electrically-conductive device 430 may be close to the same as the length 1130 of the antenna 422, e.g., between twice as long as the length 1130 and 80% as long as the length 1130, e.g., less than about 150% as long as the length 1130 or about the same as the length 1130. Any of a variety of widths of the electrically-conductive device 430 may be used. For example, as shown in FIG. 11, a width 1150 of the electrically-conductive device 430 may be about 40% of a free-space wavelength (2) of a low-end frequency for which the antenna 422 is configured, e.g., between 30% and 50% of λ. As other examples, the width 1150 may be over 1λ, e.g., between 1λ and 2λ. For example, with the antenna 422 configured for operation from about 28 GHz to about 38.5 GHZ, the width 1150 may be between about 7 mm (about 1λ at 38.5 GHZ) and 22 mm (about 2λ at 28 GHz). Other widths may be used, e.g., with the width constrained by practical limitations of the device 500, e.g., physical limitations due to housing size and presence of other components. For example, the width 1150 may be about 4 mm.

Figure 13:
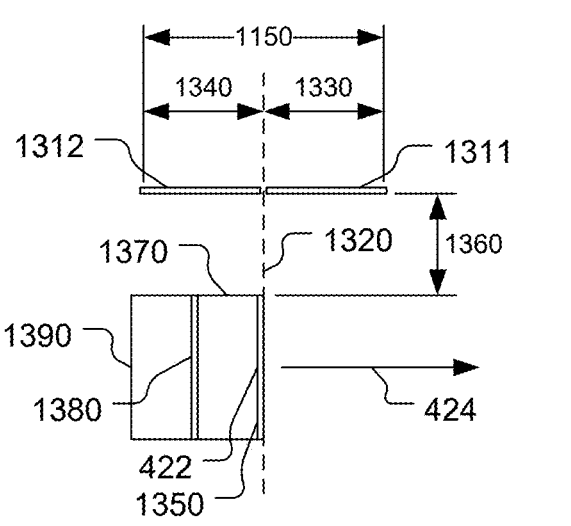
FIG. 13 is a side view of the frequency-selective surface and the antenna shown in FIG. 11.
Figure 14:
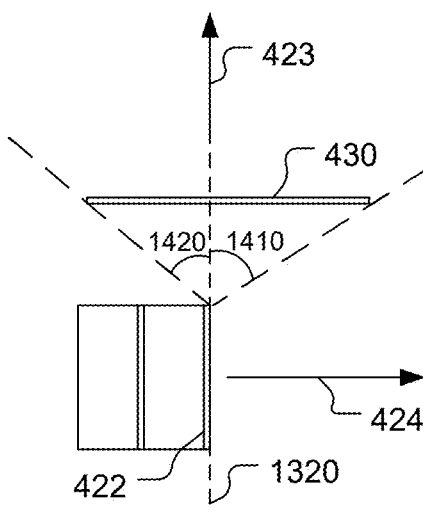
FIG. 14 is a side view of an antenna and an example of the electrically-conductive device shown in FIG. 4.

In various implementations, the electrically-conductive device 430 may be disposed at a variety of relative locations with respect to the antenna 422. For example, the electrically-conductive device 430 may be disposed to overlap an aperture plane of the antenna 422, to extend "above" the aperture plane in the boresight direction 424 of the antenna 422, and/or to extend "below" the aperture plane in a direction opposite the boresight direction 424 of the antenna 422. For example, as shown in FIGS. 11 and 13, the width 1150 of the FSS 1100 is centered along an aperture plane 1320 of the antenna 422, with an upper unit cell 1311 of the FSS 1100 extending away from an aperture plane 1320 in the boresight direction 424 for a distance 1330, here the length 1210, and a lower unit cell 1312 of the FSS 1100 extending away from the aperture plane 1320 in a direction opposite the boresight direction 424 by a distance 1340, here the length of the unit cell 1200 (i.e., the length 1210), and thus in this case about 20% of λ. FIG. 13 also shows a separator 1370 (which may include a feed network, or may be, for example, a dielectric spacer or portion of a substrate), a ground plane 1380, and a PCB 1390 or chip or integrated circuit (IC) (e.g., that may provide signals to and/or receive signals from the antenna 422). The arrangement and distance values provided for FIG. 13, are examples, and other relative locations may be used. For example, the electrically-conductive device 430 may extend different lengths away from the aperture plane 1320 (e.g., greater than 20% of λ, such as about 30% of λ, about 40% of λ, or about 50% of λ), may extend asymmetrically away from the aperture plane 1320 (e.g., extending about 30% of λ in the boresight direction 424 and about 10% of λ in the direction opposite the boresight direction 424), or may extend in only one direction away from the aperture plane 1320 (e.g., only in the boresight direction 424 or only in the direction opposite the boresight direction 424). As other examples, a width and relative location of the electrically-conductive device 430 may be selected to extend over a desired range of angles relative to the antenna 422. For example, referring also to FIG. 14, the electrically-conductive device 430 may be configured and disposed to subtend an angle 1410 from the aperture plane 1320 toward the boresight direction 424 and an angle 1420 from the aperture plane 1320 away from the boresight direction 424. Either of the angles 1410, 1420 may have any of a variety of values, e.g., between 0° and 50°, such as at least 20°, about 40°, or less than about 40°, or another angle. The angles away from the aperture plane 1320 subtended by the electrically-conductive device 430 depends on the width 1150 of the electrically-conductive device 430, how much the electrically-conductive device 430 extends from the aperture plane 1320, and a separation between the antenna 422 and the electrically-conductive device 430. In this example, the electrically-conductive device 430 is disposed to block the boresight direction 423 of the antenna 421, with the electrically-conductive device 430 subtending the angles 1410, 1420 on either side of the boresight direction 423. The electrically-conductive device 430 may subtend angles corresponding to sufficient angles to eliminate undesired pattern overlap of the antennas 421, 422 (with gain differential below a threshold without the electrically-conductive device 430), e.g., may subtend angles that would have undesired pattern overlap absent the electrically-conductive device 430.

As another example of possible relative locations of the electrically-conductive device 430 and the antenna 422, the electrically-conductive device 430 may be displaced from the antenna 422 by a variety of distances. For example, in the example shown in FIGS. 11 and 13, the FSS 1100 is displaced from the antenna 422, i.e., from antenna elements 1350 of the antenna 422 (in this example, the antenna 422 includes five antenna elements 1350 as shown in FIG. 11, but may include more or fewer antenna elements), by a distance 1360, here about a quarter of λ. For example, with the antenna 422 configured for operation from about 28 GHz to about 38.5 GHZ, the distance 1360 may be about 3 mm. This is an example, and other distances may be used, e.g., a distance between 10% and 50% of λ, or a distance of less than 1λ. The separation distance 1360 between the antenna 422 and the electrically-conductive device 430 may depend on the width of the electrically-conductive device 430 and how much the electrically-conductive device 430 extends from the aperture plane 1320. For example, the separation distance 1360 may be directly proportional to the distance 1330 that the electrically-conductive device 430 extends in the boresight direction 424 (i.e., with shorter distances 1330 corresponding to shorter distances 1360).

The electrically-conductive device 430 may be disposed at various distances from a face of the wireless communication device 400 associated with an antenna (e.g., the antenna 421) whose gain pattern undesirably overlaps with the gain pattern of the antenna 422. For example, the antenna 422 may be separated from an edge 490 between the rear surface 460 and the side surface 470 (e.g., where the edge 490 meets the rear surface 460 for a curved edge) by a distance 481 along the y-axis that is shorter than a distance 482 along the y-axis between the antenna 422 and an edge 491 of the opposite side surface 471 (opposite the side surface 470). The electrically-conductive device 430 may be displaced between the antenna 422 and the surface 470, e.g., by a distance 483 along the y-axis that is shorter than the distance 481. For example, the distance 482 may be less than about 1λ (e.g., between 0λ and 0.5λ).

In the example shown in FIG. 4, only one gain inhibitor (the electrically-conductive device 430) is used for only one antenna, but this is an example and not limiting of the disclosure. For example, multiple gain inhibitors may be used for the antenna 422, e.g., disposed near the antenna 422. As another example, one or more gain inhibitors may be used for each of two or more antennas of a single wireless communication device, e.g., each of the antennas 421, 422 of the wireless communication device 400. A gain inhibitor may be disposed between antennas that have gain patterns with undesirable gain overlap. For example, a gain inhibitor may be disposed near the antenna 422 in a direction where there is undesirable gain overlap with the antenna 421, here toward the surface 470 as the boresight direction 423 is outward from the surface 470 and undesirable gain overlap occurs in the sub-region 820 near the boresight direction

423. As another example, a gain inhibitor may be used for an antenna disposed along a side surface of a wireless communication device instead of, or in addition to, a gain inhibitor used for an antenna disposed along a larger surface (e.g., a front or rear surface). For example, a gain inhibitor may be disposed near the antenna 421, e.g., to inhibit gain overlap with the antenna 422 (e.g., inhibit gain near the boresight direction 424) and/or a gain inhibitor may be disposed near the antenna 425 to inhibit gain overlap with the antenna 422 (e.g., inhibit gain near the boresight direction 424). Such gain inhibitor(s) may be disposed substantially parallel to the surface 460. While gain inhibitors have been discussed and shown as being disposed perpendicular to aperture planes of antennas, other relationships of gain inhibitors and antennas may be used. For example, the FSS 1100 (or other gain inhibitor) is shown in FIG. 13 as being perpendicular to the aperture plane 1320 (parallel to the boresight direction 424), but the FSS 1100 could be disposed at another, non-perpendicular, angle relative to the aperture plane 1320 (e.g., within 20° of parallel to the boresight direction 424 (and thus within 20° of perpendicular to the aperture plane 1320) such as 5°, 10°, 20°, –5°, –10°, –20°, or other angle relative to the boresight direction 424). Further, while gain inhibitors such as the FSS 1100 have been shown as being planar or essentially planar, other shapes may be used (e.g., a gain inhibitor with one or more curved surfaces).

The electrically-conductive device 430 may be retained in the wireless communication device 400 in one or more of a variety of ways. For example, the device 430 may be physically attached, e.g., by a rigid member, to the antenna 422 or a module containing the antenna 421, and/or may be physically attached to the housing 410. As another example, multiple antennas may be connected by a member, e.g., by a flex cable or PCB, and the device 430 may be attached to or formed on that member. As another example, the device 430 may be attached to or formed on another portion of the device 400, e.g., being at least part of another antenna, or being part of a PCB, or a housing for a component of the device 430 (e.g., an IC), or a housing of another component may provide a portion of the device 430. As another example, the device 430 or a portion thereof may be formed on (e.g., printed on) an interior of the housing 410. Still other implementations of the electrically-conductive device 430 may be used.

Figure 15:
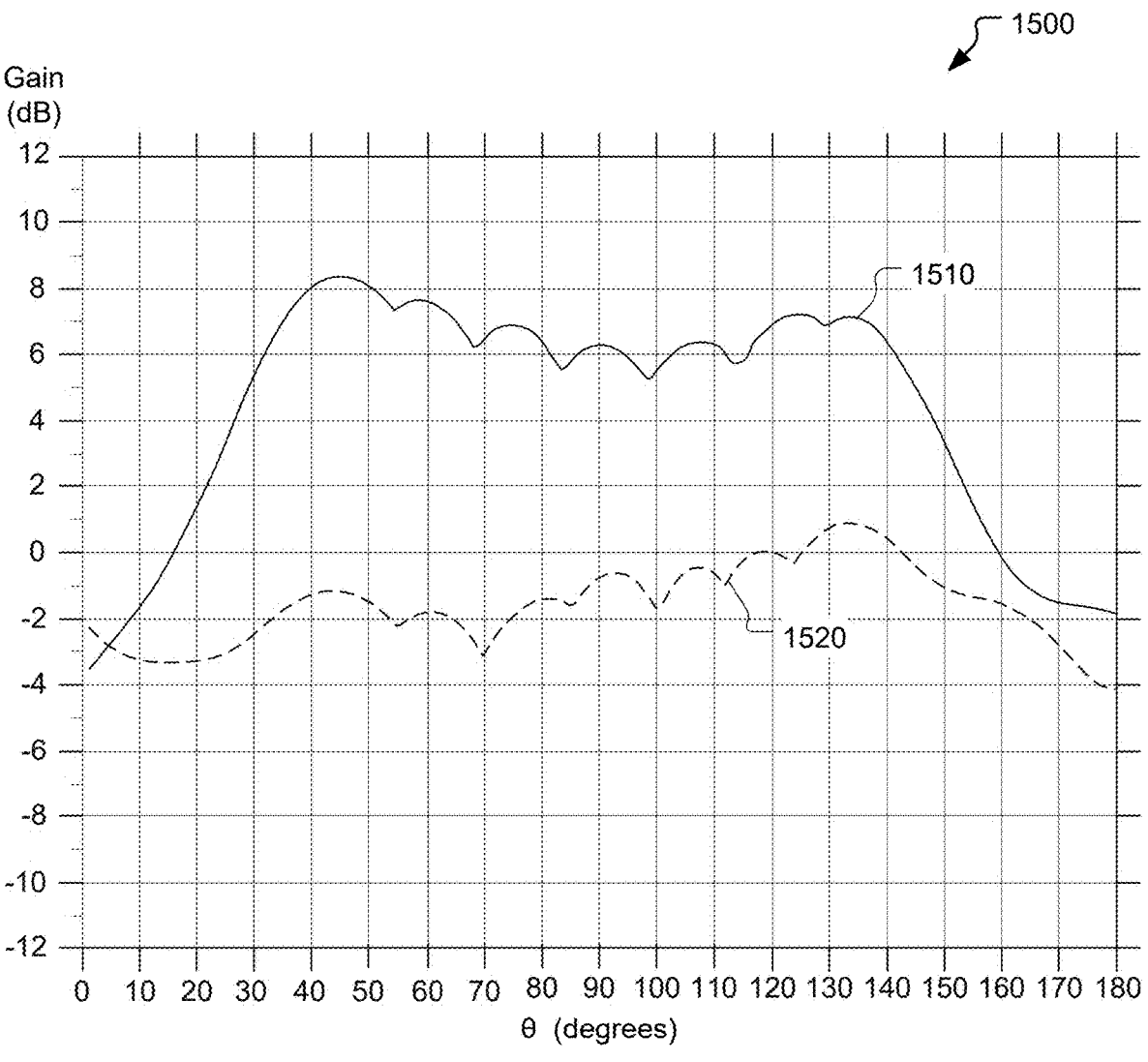
FIG. 15 is a graph of gain patterns of antennas shown in FIG. 4 with the electrically-conductive device shown in FIG. 4 in place.
Figures 16, 17:
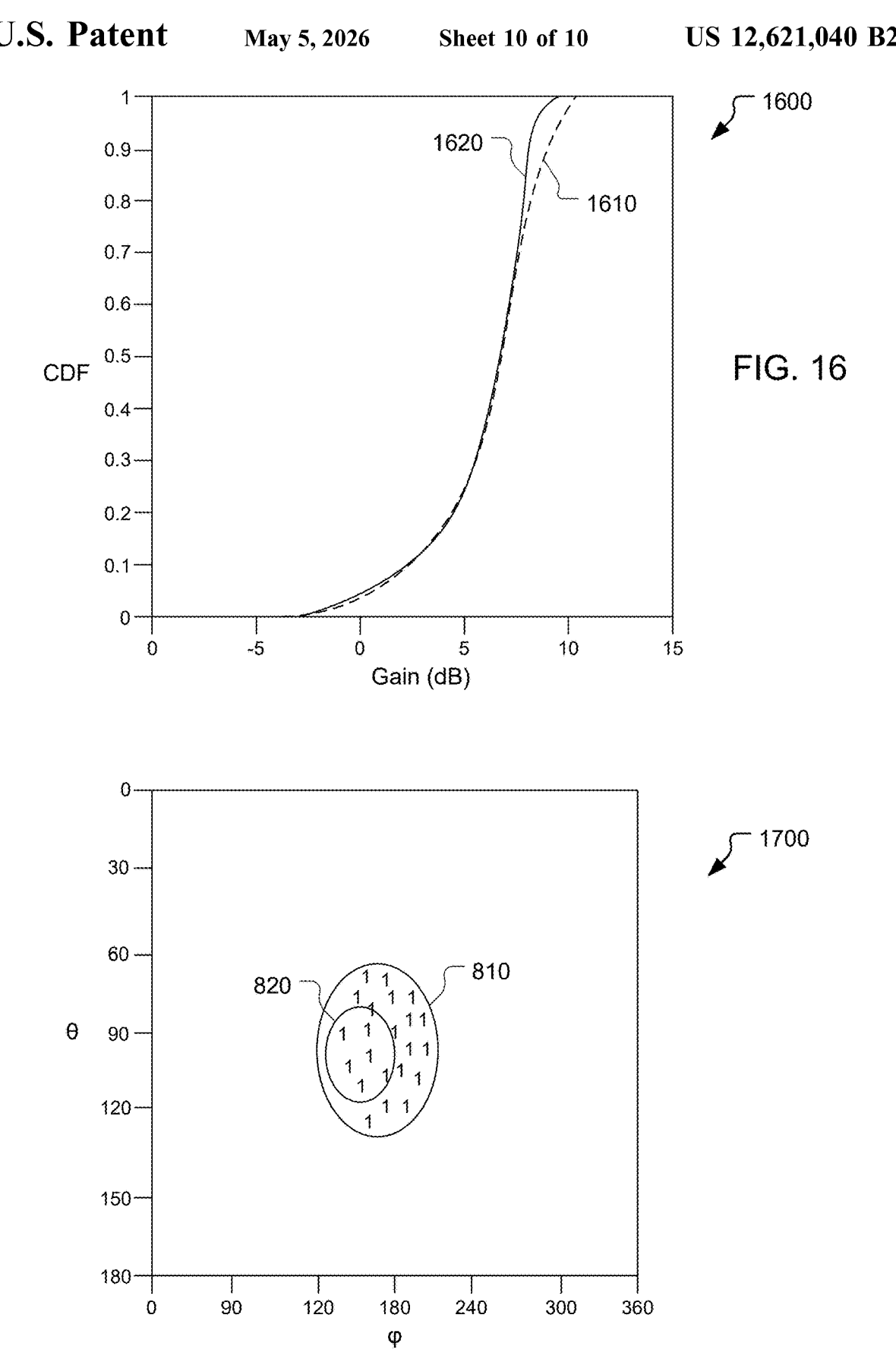
FIG. 16 is a graph of a cumulative distribution function with and without the electrically-conductive device shown in FIG. 4 in place.
FIG. 17 is a graph indicating antenna selection for different angles relative to the wireless communication device shown in FIG. 4 with an electrically-conductive device in place.

Referring also to FIGS. 15-17, it has been found that use of the electrically-conductive device 430 may increase gain differential without significantly affecting overall antenna performance of the wireless communication device 400. For example, a graph 1500 shows simulated plots 1510, 1520 of slices of gain patterns for the antennas 421, 422 with the electrically-conductive device 430 in place. Similar to the plots 710, 720 in FIG. 7, the plots 1510, 1520 correspond to the gain provided by the antennas 421, 422 in the y-z plane (with φ=90° and θ ranging from 0° to) 180°. In this example, a differential between the plots 1510, 1520 is at least about 5 dB from about θ=78° to about θ=115° while the differential between the plots 710, 720 was approximately 2 dB from about θ=78° to about θ=115°. This larger differential may help the antenna selection unit 550 select the antenna 421 for use for signal reception and/or transmission in the sub-region 820, and/or may help the antenna selection unit 550 make this selection faster, than without the electrically-conductive device 430 in place. As shown in FIG. 16, a graph 1600 includes plots 1610, 1620 of CDF of gain distribution about the wireless communication device 400 for the antennas 421, 422, 425 in combination, with and without the electrically-conductive device 430 present. The plots 1610, 1620 show the minimum gain for portions of angles in the spherical coverage area about the wireless communication device 400 with the electrically-conductive device 430 in place. For example, for CDF 0.7, 30% of spherical coverage angles about the wireless communication device 400 will have at least about 8 dB of antenna gain provided by the combination of the antennas 421, 422, 425, with gain for each angle provided by a respective one of the antennas 421, 422, 425. As shown by the plots 1610, 1620, presence of the electrically-conductive device 430 has almost little if any negative impact on CDF, and indeed has some positive impact on about 30% of coverage angles (CDF above 0.7 with the electrically-conductive device 430 present (plot 1610) having higher gain than without the electrically-conductive device 430 present (plot 1620)). Also, as shown in FIG. 17, a graph 1700, similar to the graph 800, is provided of the space (in spherical coordinates) around the wireless communication device 400 but with the electrically-conductive device 430 in place. The graph 1700, like the graph 800, provides indications of which of the antennas 421, 422 (with a "1" corresponding to the antenna 421 and a "2" corresponding to the antenna 422) will be selected for signal transmission and/or reception, with the selection being based on antenna gains at the respective angles. For the sake of simplicity of the figure, indications of the antennas 421, 422 are shown only within the region 810 (the same region as shown in FIG. 8). As can be seen from a comparison of the graph 1700 to the graph 800, introduction of the electrically-conductive device 430 (e.g., an FSS) has caused selection of only the antenna 421 in the region 810 as opposed to selection of the antenna 421 in most of the region 810 but selection of the antenna 422 in the sub-region 820 of the region 810.

By using a gain inhibiting structure such as the electrically-conductive device 430, gain pattern overlap between different antennas may be reduced (e.g., gain differential increased between overlapping gain patterns). This may enable a beam selection algorithm implemented by the antenna selection unit 550 to select the antenna with higher receive signal power correctly and quickly, which may result in higher throughout and lower latency. The device 400 may, however, operate multiple antennas concurrently, possibly with no specific ending of concurrent operation, or until operation of one or more of the antennas is stopped (e.g., due to selection of one of the antennas as providing the better (or best) gain)). Quick selection of a single antenna or array, in contrast, may reduce power consumption. The electrically-conductive device 430 may be a compact structure that can be implemented in a commercial wireless communication device such as a smartphone, a tablet computer, router, CPE, etc. Various manufacturing techniques may be used to implement the electrically-conductive device 430, e.g., laser printing metal (e.g., onto a plastic housing of the device 400), embedding the electrically-conductive device 430 into a phone display, etc.

IMPLEMENTATION EXAMPLES

Implementation examples are provided in the following numbered clauses.

Clause 1. A wireless communication device comprises:

a first antenna comprising one or more first antenna elements with one or more of the one or more first antenna elements being configured to provide a first gain pattern at a millimeter-wave radio frequency, the first antenna having a first boresight direction;

a second antenna comprising one or more second antenna elements with one or more of the one or more second antenna elements being configured to provide a second gain pattern at the millimeter-wave radio frequency, the second antenna having a second boresight direction that is different from the first boresight direction; and an electrically-conductive device, comprising at least one conductive surface;

wherein the first antenna, in combination with the electrically-conductive device, is configured to provide a third gain pattern that has a first gain differential relative to the second gain pattern that is greater than a second gain differential between the first gain pattern and the second gain pattern over a range of angles relative to the wireless communication device.

Clause 2. The wireless communication device of clause 1, wherein the range of angles relative to the wireless communication device includes the second boresight direction.

Clause 3. The wireless communication device of clause 1, wherein the first antenna has a first length, and the electrically-conductive device has a second length that is at least as long as the first length.

Clause 4. The wireless communication device of clause 3, wherein the second length is less than twice the first length.

Clause 5. The wireless communication device of clause 1, wherein the first antenna defines an aperture plane substantially perpendicular to the first boresight direction, wherein the one or more first antenna elements are disposed on a first side of the aperture plane and at least a portion of the at least one conductive surface is disposed on a second side of the aperture plane opposite the first side of the aperture plane.

Clause 6. The wireless communication device of clause 5, wherein the first antenna has an edge in the aperture plane, and wherein the at least a portion of the at least one conductive surface extends away from the aperture plane at least 20°, relative to the edge, on the second side of the aperture plane.

Clause 7. The wireless communication device of clause 1, wherein the first antenna defines an aperture plane substantially perpendicular to the first boresight direction, and wherein the one or more first antenna elements and at least a portion of the at least one conductive surface are disposed on a same side of the aperture plane.

Clause 8. The wireless communication device of clause 7, wherein the first antenna has an edge in the aperture plane, and wherein the at least a portion of the at least one conductive surface extends away from the aperture plane at least 20°, relative to the edge, on the same side of the aperture plane.

Clause 9. The wireless communication device of clause 1, wherein the at least one conductive surface is displaced from the first antenna by between 20% of a wavelength at the millimeter-wave radio frequency and 50% of the wavelength at the millimeter-wave radio frequency.

Clause 10. The wireless communication device of clause 1, wherein the at least one conductive surface defines a conductive plane within 20° of parallel to the first boresight direction.

Clause 11. The wireless communication device of clause 10, wherein the electrically-conductive device comprises a frequency-selective surface configured to inhibit passage through the electrically-conductive device of first energy of a particular frequency range more than second energy outside the particular frequency range, the particular frequency range including the millimeter-wave radio frequency.

Clause 12. The wireless communication device of clause 1, wherein the millimeter-wave radio frequency is a first frequency that is above 25 GHZ, the wireless communication device further comprising a third antenna that includes the electrically-conductive device, and wherein the electrically-conductive device is configured to provide a fourth gain pattern at a second frequency band that is below 7 GHz.

Clause 13. The wireless communication device of clause 1, wherein the electrically-conductive device comprises a monolithic conductor that provides the at least one conductive surface.

Clause 14. The wireless communication device of clause 1, wherein the electrically-conductive device comprises a frequency-selective surface configured to inhibit passage through the electrically-conductive device of first energy of a particular frequency range more than second energy outside the particular frequency range, the particular frequency range including the millimeter-wave radio frequency.

Clause 15. The wireless communication device of clause 14, wherein the frequency-selective surface comprises a plurality of conductive cells displaced from each other.

Clause 16. The wireless communication device of clause 14, wherein the frequency-selective surface is configured to suppress frequencies in an approximately 3 GHz bandwidth in the 20 GHz or 30 GHz range by 15 dB or more.

Clause 17. The wireless communication device of clause 1, further comprising a processor communicatively coupled to the first antenna and the second antenna and configured to:
determine a first power level of a first signal received by the first antenna from a particular angle relative to a housing of the wireless communication device;
determine a second power level of a second signal received by the second antenna from the particular angle relative to the housing; and
select one of the first antenna and the second antenna to at least one or transmit or receive a third signal corresponding to the particular angle relative to the housing based on which of the first power level and the second power level is higher.

Clause 18. The wireless communication device of clause 1, further comprising a housing containing the first antenna and the second antenna and defining at least a partially cuboidal shape including a first surface, a second surface, and a third surface, wherein the first boresight direction is substantially perpendicular to the first surface, the second boresight direction is substantially perpendicular to the second surface, and the second surface is disposed opposite the third surface and displaced from the third surface along an axis of the housing, and wherein the first antenna is displaced a first distance along the axis from the second surface and displaced a second distance along the axis from the third surface, the first distance being shorter than the second distance.

Other Considerations

Other examples and implementations are within the scope of the disclosure and appended claims. For example, configurations other than those shown may be used. Also, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X. or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of +20% or +10%, +5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A wireless communication device comprising:
an antenna comprising one or more antenna elements with one or more of the one or more antenna elements being configured to provide a first gain pattern at a millimeter-wave radio frequency, the antenna having a boresight direction; and
an electrically-conductive device comprising at least one conductive surface disposed adjacent to the antenna that is approximately parallel with the boresight direction, wherein the antenna, in combination with the electrically-conductive device, is configured to provide a second gain pattern that is different from the first gain pattern.

2. The wireless communication device of claim 1, wherein the antenna has a first length, and the electrically-conductive device has a second length that is at least as long as the first length.

3. The wireless communication device of claim 1, wherein the antenna has a first length, and the electrically-conductive device has a second length that is less than the first length.

4. The wireless communication device of claim 1, wherein the electrically-conductive device is physically attached to the antenna.

5. The wireless communication device of claim 1, wherein the electrically-conductive device is physically attached to a housing of the wireless communication device.

6. The wireless communication device of claim 1 further comprising a display layer and a bottom cover, wherein the antenna is disposed between the display layer and the bottom cover, and the electrically-conductive device is disposed between the antenna and the bottom cover.

7. The wireless communication device of claim 1, wherein the one or more antenna elements are disposed on a substrate in an antenna module, and the electrically-conductive device is physically attached to the antenna module.

8. The wireless communication device of claim 1, wherein the electrically-conductive device comprises a monolithic conductor that provides the at least one conductive surface.

9. The wireless communication device of claim 1, wherein the electrically-conductive device is non-monolithic.

10. The wireless communication device of claim 9, wherein the electrically-conductive device comprises a regular pattern of similarly-shaped electrically-conductive pieces.

11. The wireless communication device of claim 1, wherein the antenna has a first width, and the electrically-conductive device has a second width that is wider than the first width.

12. The wireless communication device of claim 1, wherein the electrically-conductive device extends away from the antenna in a direction that is opposite to the boresight direction.

13. The wireless communication device of claim 1, wherein the at least one conductive surface is displaced from the antenna within less than 20% of a wavelength at the millimeter-wave radio frequency.

14. The wireless communication device of claim 1 wherein the antenna includes an array of antennas.

15. A wireless communication device comprising:

a top cover;

a bottom cover that is substantially parallel to the top cover;

an antenna comprising one or more antenna elements disposed between the top cover and the bottom cover, the one or more antenna elements being configured to provide a first gain pattern at a millimeter-wave radio frequency, the antenna having a boresight direction directed out of a side surface of the device between the top cover and the bottom cover; and an electrically-conductive device comprising at least one conductive surface that is disposed between the antenna and the bottom cover and is approximately parallel with the top cover, the electrically-conductive device having a length that is at least a length of the antenna, and a width that extends away from the antenna in an opposite direction from the boresight direction, wherein the antenna, in combination with the electrically-conductive device, is configured to provide a second gain pattern that is different from the first gain pattern.

16. The wireless communication device of claim 15, wherein the electrically-conductive device is physically attached to the antenna.

17. The wireless communication device of claim 15, wherein the electrically-conductive device is physically attached to the bottom cover.

18. The wireless communication device of claim 15, wherein the electrically-conductive device comprises a monolithic conductor that provides the at least one conductive surface, and wherein the at least one conductive surface is displaced from the antenna along an aperture plane of the antenna.

19. The wireless communication device of claim 18, wherein the width is less than two free-space wavelengths of a low-end frequency for which the antenna is configured, wherein the antenna includes an array of antennas, and wherein the length is less than twice as long as a length of the array.

20. The wireless communication device of claim 15, wherein the electrically-conductive device comprises a regular pattern of similarly-shaped electrically-conductive pieces.

* * * * *